July 19, 1927. W. F. SCHLEICH Re. 16,681

BIRD CAGE

Original Filed Dec. 2, 1922

Inventor

William Frederick Schleich

By Henry E. Rockwell

Attorney

Reissued July 19, 1927. Re. 16,681

UNITED STATES PATENT OFFICE.

WILLIAM FREDERICK SCHLEICH, OF HARRISON, NEW YORK, ASSIGNOR TO SCHLEICH STUDIOS, INC., OF NEW YORK, N. Y., A CORPORATION OF NEW YORK.

BIRD CAGE.

Original No. 1,502,748, dated July 29, 1924, Serial No. 604,481, filed December 2, 1922. Application for reissue filed May 9, 1925. Serial No. 29,252.

This invention relates to improvements in bird cages, and has for its object the production of a cage construction which is provided with special protective means, is readily and cheaply made, and which has a neat and attractive appearance.

A further object includes the provision of a removable hemispherical shield for the lower part of the cage to conceal from view said portion of the cage.

Other objects will appear hereinafter, and I attain these results by the construction shown in the accompanying drawing, in which Fig. 1 is a view in elevation of a bird cage embodying my improvements;

The essential parts of my cage construction, to which, however, I do not desire to be limited, consist of a body portion comprising symmetrically arranged side bars and end portions or shields secured to the body portion. The side bars 10 are secured together within the upper tip or shield 11 which, as shown, is cone-shaped in form, and at their lower ends are secured to a spacer ring 12. These bars are disposed in a generally upright position, and to them are secured a suitable number of horizontal rails or wires 22 to form a more or less rigid body.

Figure 1:
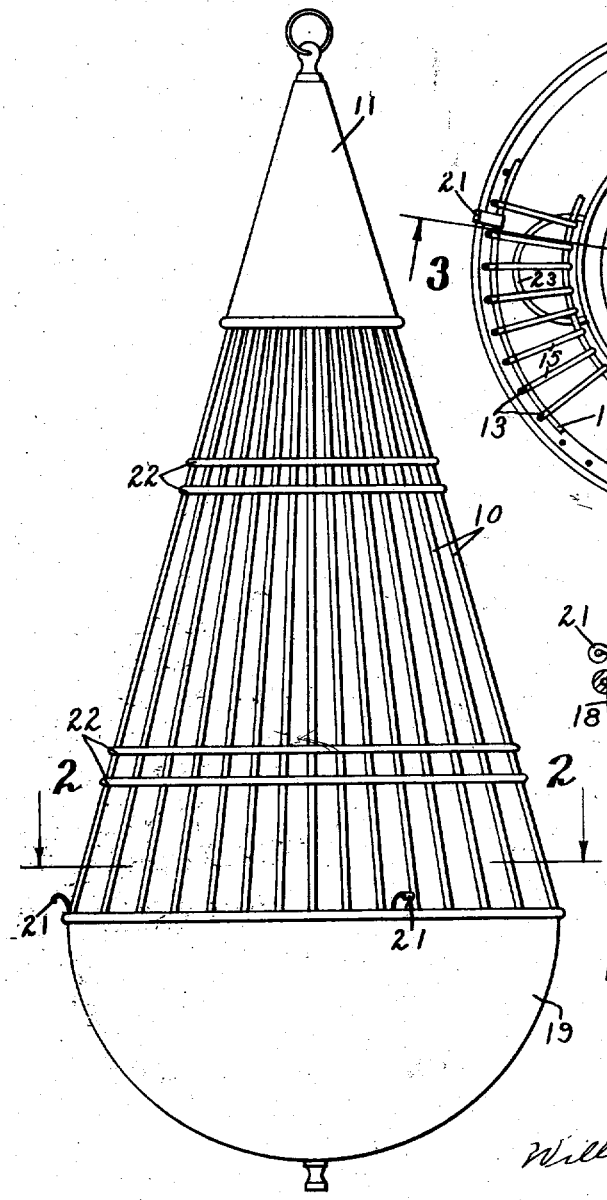
Figure 2:
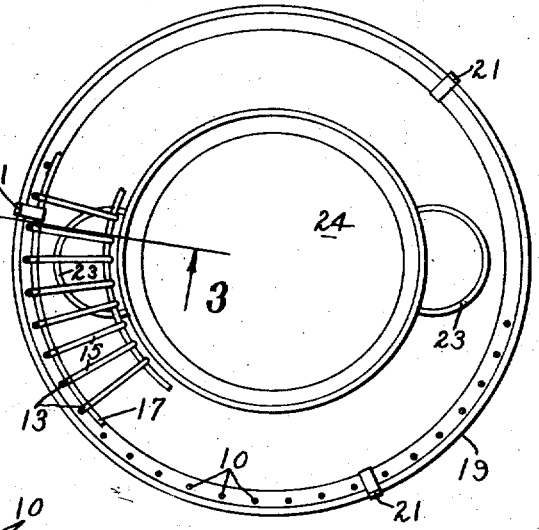
Fig. 2 is a sectional view taken on line 2—2 of Fig. 1.
Figure 3:
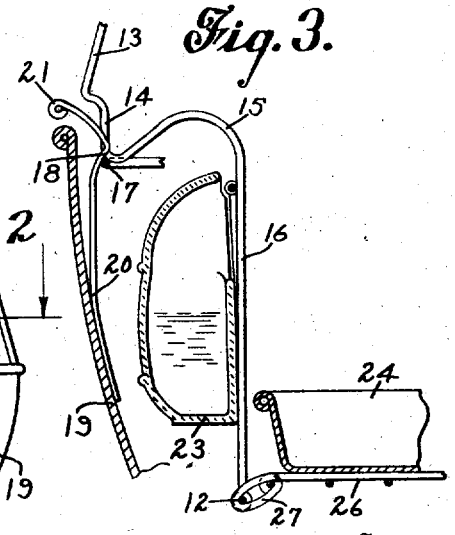
Fig. 3 is a sectional view on line 3—3 of Fig. 2.

Each of the bars, designated generally by the numeral 10, comprises a straight section 13, a slightly offset portion 14, and an inturned part 15 which ends in a straight portion 16. It will be apparent from an inspection of Fig. 3 of the drawing, that the portions 16 are offset to a considerable extent from the straight sections 13 of the bars, and are spaced from the wall of the lower shield 19.

A horizontally disposed reinforcing ring 17 is secured to the bars adjacent the inturned portion 15 thereof and assists in holding the bars in proper relation at this point. This ring also affords means by which the shield 19 may be secured to the body of the cage by means of the spring hooks 18 which are secured to the shield at suitable points 20 adjacent one end thereof, and are shaped to hook over this ring. These hooks are made of resilient material, and are provided with an upper extension 21 by which they may be manipulated to release the shield from the body of the cage.

Within the lower shield which, as shown, is substantially hemispherical in shape, are disposed the water and food receptacles 23 and the pan 24. These receptacles may be attached in any suitable way, but are preferably secured to and supported by the offset portions 16 of the bars, the position of these bars permitting these receptacles to stand between them and the wall of the lower shield. The pan rests upon the cage bottom 26, which is constructed to swing on a hinge 27 and thereby permit removal of the pan for cleaning or for other purposes. To open the cage the lower shield is removed by manipulating the catch 21 and permitting the shield to drop down. This leaves the lower part of the cage exposed, and the bottom 26 may then be swung down to permit access to the pan 24, or the food and water receptacles may be disconnected from the bars 16 for the supplying of food and water.

By having the shield surrounding the lower part of the cage the bird is protected, and no food is scattered about. The upper tip member or shield may also afford a retreat for the bird, besides serving as a convenient means for supporting the cage, and both upper and lower shields, taken with the exposed straight line side bars, afford a pleasing, symmetrical construction, which is ornamental as well as useful.

While I have described an embodiment of my invention, and have shown one form of its application, I do not thereby desire to be understood as having thus limited myself unnecessarily.

What I claim, therefore, as new and useful, and of my own invention, and desire to secure by Letters Patent, is:

1. A bird cage comprising an upper body portion and a lower body portion having its walls offset inwardly from the upper body portion, a shield adapted to telescope over the lower portion and closely embrace the lower edge of the upper portion to form a closed structure therewith, and means carried on the shield for engaging the upper body portion to secure the shield thereon.

2. A bird cage comprising an upper body portion and a lower body portion, a shield adapted to telescope over the lower portion and closely embrace the lower edge of the upper body portion to form a closed structure therewith, a horizontal bar carried by the upper portion, and spring fingers carried on the interior of the shield adapted to engage the bar to secure the shield thereon by a longitudinal thrust of the shield onto the body portion.

3. A bird cage construction, comprising an upper shield, a lower shield, bars attached to and diverging from the upper shield and extending into the lower shield, said bars terminating in offset portions within the lower shield, receptacles secured to said offset portions, and means for holding said lower shield releasably over said offset portions.

4. A bird cage construction, having a body portion comprising spaced bars and horizontal rails, a lower shield, said bars extending into the shield and there terminating in offset portions, receptacles secured to said offset portions, and means for releasably holding the shield over the lower ends of the bars to conceal the receptacles.

5. A bird cage comprising an upper tip portion, a lower shield, and bars connected to and diverging from the tip portion and extending within the shield, means for releasably connecting the shield to the bars, upright members within the shield and offset inwardly from the portions of the bars adjacent the upper edge of the shield, and receptacles secured to said members and disposed between the latter and the wall of the shield.

6. A bird cage having a body portion consisting of spaced bars, and a bottom portion comprising a bowl-shaped shield detachably connected to the body and closely conforming to the body portion adjacent the upper edge of the shield to form a closed cage, and members secured within said shield to which a receptacle or the like may be secured, said members being offset inwardly from the portions of the bars adjacent the upper edge of the shield to permit the positioning of the receptacle between the wall of the shield and said members.

7. A bird cage having a body portion, consisting of spaced bars, and a bottom portion comprising a bowl-shaped shield having its upper edge of substantially the same diameter as a portion of the body of the cage, and detachably secured thereto adjacent said edge, and upright members formed integrally with said body portion extending within the shield and offset inwardly from the wall thereof to which receptacles may be secured between said members and said shield.

8. A bird cage comprising a body portion consisting of spaced bars, and a bowl-shaped shield detachably secured to the body portion, a pan within the shield, upright members secured adjacent the edge of the pan bottom and adapted to have food receptacles secured thereto, the upper ends of said members being turned laterally and secured to the cage to space the upright portions from the wall of the shield.

9. A bird cage construction comprising a conical shield, an opaque hemispherical shied, bars radiating from said conical shield and extending into said hemispherical shield, said bars being attached to said conical shield and terminating in offset portions within said hemispherical shield, receptacles on said offset portions, and means for holding said hemispherical shield releasable from the offset portions.

10. A bird cage comprising an upper body portion and a lower body portion, receptacles carried on the exterior of said lower body portion, and a rigid shield telescoped over said lower body portion and said receptacles and secured on said upper body portion, said shield closely conforming to said upper body portion where the shield is secured thereon.

11. A bird cage comprising an upper body portion and a lower shield, said shield being attached to said upper body portion and closely conforming to the lower edge thereof to form with said body portion a closed cage structure, and means in said cage adapted to support food receptacles, said means being carried within said shield in a normally concealed position when said cage is viewed from a position in or below the horizontal plane of the upper edge of said shield.

12. A bird cage comprising an upper body portion and a lower shield, said shield being attached to said upper body portion and closely conforming to the lower edge thereof to form with said body portion a closed cage structure, means carried within said shield and normally concealed thereby adapted to support food receptacles, said means being spaced from said shield whereby the food receptacles may be carried between said means and said shield.

13. A bird cage comprising an upper body portion and a lower shield, said shield being attached to said upper body portion and closely conforming to the lower edge thereof to form with said body portion a closed cage structure, and inverted L-shaped members supported on said cage within said shield and normally concealed by the latter when said cage is viewed from a position in or below the horizontal plane of the upper edge of said shield, said members being adapted to have food receptacles secured thereon.

14. A bird cage comprising an upper body portion and a lower shield, said shield being attached to said upper body portion and closely conforming to the lower edge thereof to form with said body portion a closed cage structure, and inverted L-shaped members supported on said cage within said shield and normally concealed by the latter, said members including upright portions spaced from said shield and adapted to have food receptacles secured thereon between said upright portions and said shield.

15. A bird cage comprising an upper body portion composed of spaced upright bars and horizontally disposed rails, a lower body portion comprising an opaque shield, one of the horizontally disposed rails being adjacent the lower portion of the body portion of the cage and having the shield detachably secured thereto, the upper edge of the shield closely conforming to the body portion of the cage adjacent said rail so as to form therewith a closed cage structure, and means carried within said shield adapted to support food receptacles, said means being concealed when the cage is viewed from a position in or below the horizontal plane of the upper edge of the shield.

In witness whereof I have hereunto set my hand this 27th day of April, 1925.

WILLIAM FREDERICK SCHLEICH.